US010968122B2

United States Patent
Jain et al.

(10) Patent No.: US 10,968,122 B2
(45) Date of Patent: Apr. 6, 2021

(54) RECOVERY OF METALS FROM INDUSTRIAL WASTEWATER OF LOW METAL CONCENTRATION

(71) Applicant: HELMHOLTZ-ZENTRUM DRESDEN—ROSSENDORF E. V., Dresden (DE)

(72) Inventors: Rohan Jain, Dresden (DE); Katrin Pollmann, Dresden (DE); Falk Lehmann, Dresden (DE)

(73) Assignee: HELMHOLTZ-ZENTRUM DRESDEN—ROSSENDORF E.V., Dresden (DE)

( * ) Notice: Subject to any disclaimer, the term of this patent is extended or adjusted under 35 U.S.C. 154(b) by 0 days.

(21) Appl. No.: 17/043,904

(22) PCT Filed: Apr. 3, 2019

(86) PCT No.: PCT/EP2019/058383
§ 371 (c)(1),
(2) Date: Sep. 30, 2020

(87) PCT Pub. No.: WO2019/193042
PCT Pub. Date: Oct. 10, 2019

(65) Prior Publication Data
US 2021/0017054 A1 Jan. 21, 2021

(30) Foreign Application Priority Data
Apr. 4, 2018 (DE) .................... 10 2018 107 923.0

(51) Int. Cl.
*C02F 1/26* (2006.01)
*C02F 1/68* (2006.01)
(Continued)

(52) U.S. Cl.
CPC ............... *C02F 1/683* (2013.01); *C02F 1/26* (2013.01); *C02F 1/442* (2013.01); *C22B 7/006* (2013.01);
(Continued)

(58) Field of Classification Search
None
See application file for complete search history.

(56) References Cited

U.S. PATENT DOCUMENTS 10,773,978 B2 * 9/2020 Gueguen ................ C02F 1/62
2005/0228103 A1 * 10/2005 Bringley ............... A23L 3/3454
524/445
(Continued)

FOREIGN PATENT DOCUMENTS

CN 106854030 A 6/2017
DE 10045830 A1 4/2001

OTHER PUBLICATIONS

International Search Report (and English translation) and Written Opinion of the International Searching Authority (and English Translation) for International Application No. PCT/EP2019/058383 dated May 24, 2019.
(Continued)

*Primary Examiner* — Chester T Barry
(74) *Attorney, Agent, or Firm* — Heslin Rothenberg Farley & Mesiti P.C.

(57) ABSTRACT

The invention relates to a multi-step method for the selective, environmentally friendly and economical recovery of non-ferrous metals from industrial wastewater. The method is based on the principle of the complexing of the non-ferrous metals, separating out of the complexes and subsequent decomplexing of the non-ferrous metals. Siderophores are used as complexing agents. The siderophores are recovered within the process. The method can be used in particu-
(Continued)

lar even in the case of low non-ferrous metal concentrations. The method is efficient, environmentally friendly and economical.

20 Claims, 1 Drawing Sheet

(51) Int. Cl.
*C02F 1/44* (2006.01)
*C22B 7/00* (2006.01)
*C02F 101/20* (2006.01)

(52) U.S. Cl.
CPC ...... *C02F 2101/20* (2013.01); *C02F 2303/18* (2013.01)

(56) References Cited

U.S. PATENT DOCUMENTS

| | | | |
|---|---|---|---|
| 2012/0325740 A1 | 12/2012 | Kruglick | |
| 2018/0065940 A1* | 3/2018 | Pfeifer | C02F 1/288 |
| 2019/0210898 A1* | 7/2019 | Gueguen | C02F 1/62 |

OTHER PUBLICATIONS

Borgias, B., et al., Isomerization and Solution Structures of Desferrioxamine B Complexes of $Al^{3+}$ and $Ga^{3+1}$, Inorganic Chemistry, vol. 28, No. 18, pp. 3538-3545 (1989).
Gadd, G.M., "Biosorption", Chemistry and Industry, No. 13, pp. 421-426 (1990).
Gladyshev, S.V., et al., "Recovery of vanadium and gallium from solid waste by-products of Bayer process", Minerals Engineering, vol. 74, pp. 91-98 (2015).
Hernlem, B.J., et al., "The Application of Siderophores for Metal Recovery and Waste Remediation: Examination of Correlations for Prediction of Metal Affinities", Wat. Res., vol. 33, No. 4, pp. 951-960 (1999).
Jain, R., et al., "Investigation of the Ga Complexation Behaviour of the Siderophore Desferrioxamine B", Solid State Phenomena, vol. 262, pp. 643-646 (2017).
Kinoshita, T., et al., "Selective recovery of gallium with continuous counter-current foam separation and its application to leaching solution of zinc refinery residues", vol. 78, pp. 181-188 (2011).
Liu, F., et al., "Recovery and separation of gallium(III) and germanium(IV) from zinc refinery residues: Part II: Solvent extraction", Hydrometallurgy, vol. 171, pp. 149-156 (2017).
Martinez, J.S., et al., "Self-Assembling Amphiphilic Siderophores from Marine Bacteria", Science, vol. 287, pp. 1245-1247 (2000).
Nair, A., et al., "Production and Characterization of Siderophores and its Application in Arsenic Removal from Contaminated Soil", Water Air Soil Pollut, vol. 180, pp. 199-212 (2006).
Nair, A., et al., "Study of speciation of metals in an industrial sludge and evaluation of metal chelators for their removal", Journal of Hazardous Materials, vol. 152, pp. 545-553 (2008).
Nusen, S., et al., "Recovery of indium and gallium from synthetic leach solution of zinc refinery residues using synergistic solvent extraction with LIX 63 and Versatic 10 acid", Hydrometallurgy, vol. 160, pp. 137-146 (2016).
Renard, G., et al., "Immobilisation of a biological chelate in porous mesostructured silica for selective metal removal from wastewater and its recovery", New J. Chem., vol. 29, pp. 912-918 (2005).
Roosen, J., et al., "Chemical immobilization of 8-hydroxyquinoline and 8-hydroxyquinaldine on chitosan-silica adsorbent materials for the selective recovery of gallium from Bayer liquor", Hydrometallurgy, vol. 171, pp. 275-284 (2017).
Su, B., et al., "Fl-Dfo molecules@mesoporous silica materials: Highly sensitive and selective nanosensor for dosing with iron ions", Journal of Colloid and Interface Science, vol. 358, pp. 136-145 (2011).
Takagai, Y., et al., "Adsorption behaviors of high-valence metal ions on desferrioxamine B immobilization nylon 6,6 chelate fiber under highly acidic conditions", Journal of Colloid and Interface Science, vol. 313, pp. 359-362 (2007).
Zhang, G., et al., "Ferric Stability Constants of Representative Marine Siderophores: Marinobactins, Aquachelins, and Petrobactin", Inorg Chem., vol. 48, No. 23, pp. 11466-11473 (2009).

\* cited by examiner

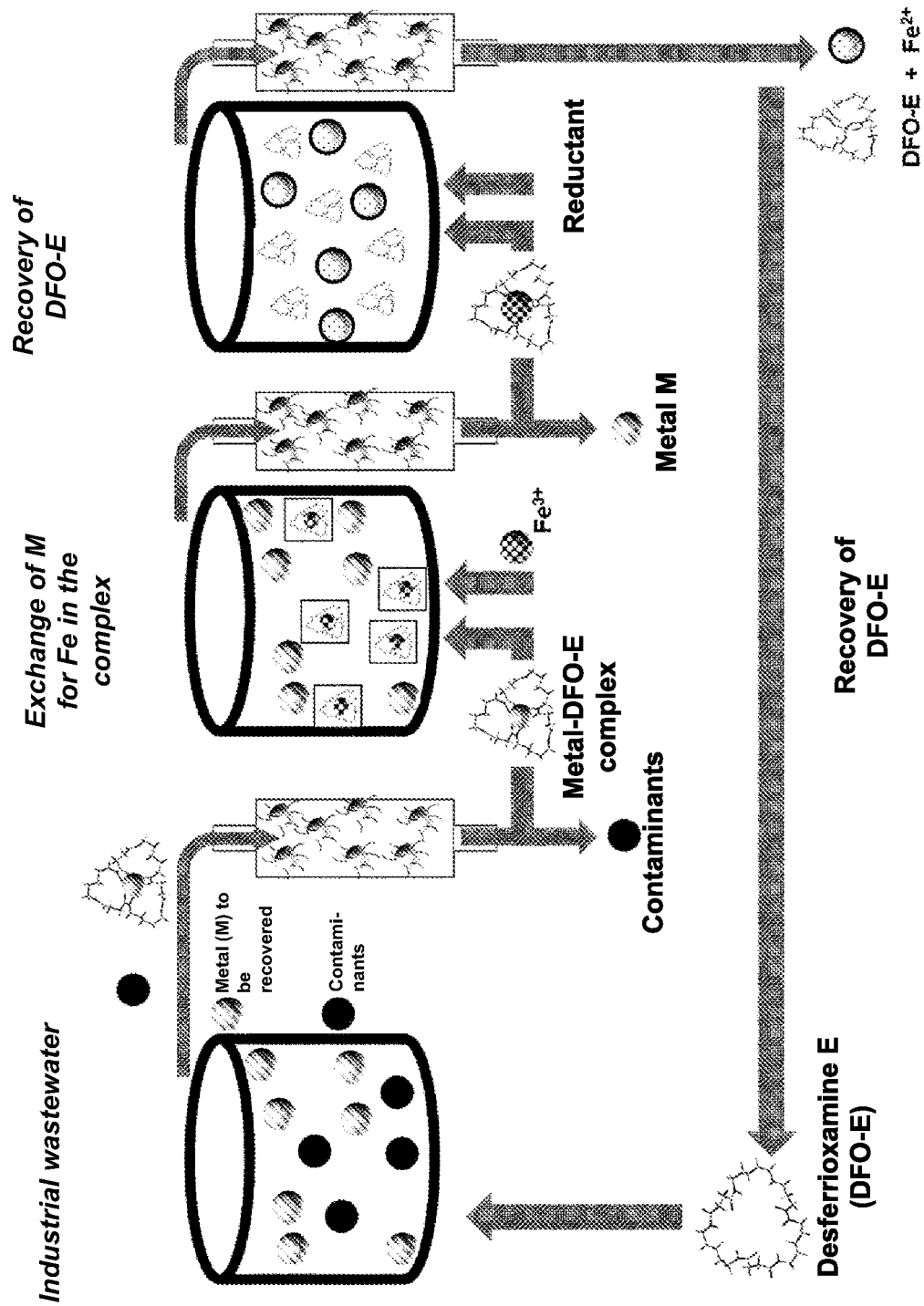

RECOVERY OF METALS FROM INDUSTRIAL WASTEWATER OF LOW METAL CONCENTRATION

CROSS REFERENCE TO RELATED APPLICATIONS

This application is a national stage filing under section 371 of International Application No. PCT/EP2019/058383 filed on Apr. 3, 2019, and published on Oct. 10, 2019 as WO 2019/193042, which claims priority to German Application No. 10 2018 107 923.0, filed on Apr. 4, 2018. The entire contents of WO 2019/193042 are hereby incorporated herein by reference.

Recovery of metals from industrial wastewater of low metal concentration

The present invention relates to a method for recovering metals from industrial wastewater.

In recent years, numerous studies have been undertaken to develop cheaper and more effective methods for recovering metals from industrial wastewater. One interesting variant is that of selective sorption.

Sorption is a cost-effective technology for recovering metals from industrial wastewater, but is often accompanied by low selectivity of the sorber with respect to the metal to be recovered. Functionalisation with complexing agents, which are selective for the metal to be recovered, is recommended in order to increase the selectivity.

Renard et al. (2005) address the uptake and release of Fe(III) from multi-metallic model wastewater solutions using pyoverdin siderophores, a complexing agent secreted by bacteria, which were immobilised on MTS (micelle-templated silicas). Only the chelation of Fe(III) was addressed. Only high metal concentrations (40 mg/mL) are tested. The Fe(III) was released from the complex by reduction to Fe(II) using $NaHSO_3$. No developments were made to regenerate the pyoverdin siderophores.

Only a very small amount of the pyoverdins could be loaded onto the MTS in this immobilisation. Assuming that one pyoverdin complexes one $Fe^{3+}$ ion (1:1), only a very low complexation capacity of 2.5 mg of iron per g of carrier material can be achieved. For an application on a large scale, the amount of carrier material required would therefore be far too large.

Immobilising siderophores is thus known from the prior art.

Roosen et al. (2017) describe the immobilisation of the two low-molecular complexing agents 8-hydroxyquinoline and 8-hydroxyquinaldine on chitosan-silica resins for recovering Ga(III) and Al(III) from strongly alkaline model wastewater solutions (synthetic Bayer solutions). Complexes having Al(III) are formed primarily and the method is not suitable for selectively separating gallium. It is also disadvantageous that the complexing agents can only be produced by organic chemical synthesis methods and not using microorganisms, and are therefore not advantageous for ecological reasons. Only high metal concentrations were tested (140 mg/L Ga).

In general, all existing methods can only be used for high concentrations of metals (>40 mg/L). None of the existing methods are suitable for highly diluted industrial wastewater, i.e. in which the content of the metal to be recovered is <40 mg/L.

The efficiency of metal recovery is generally low in all of these methods.

Martinez et al. (2000) describe the complexation of Fe(III) by marine siderophores such as aquachelins and marinobactins.

Marine siderophores and their complexation with Fe(III) and Ga(III) were analytically studied by means of $^{13}C$ NMR and IR spectroscopy by Zhang et al. (2009).

Takagai et al. (2007) immobilised the siderophore desferrioxamine B (DFO-B) on nylon 6,6 and studied the complexation of different metals by means of subsequent solvent extraction.

All of these methods based on complexation generally involve difficulties in, inter alia, the purification steps, e.g. when: separating metals from solutions, for example in the form of complexes, or separating the metal after it has been released from such a complex.

In the event that complexing agents are used for metal recovery, there is also the problem of effectively recovering the complexing agent for reuse. In such a process for metal recovery using complexing agents, the latter aspect of recovering the complexing agent is a necessary condition for the process to be economical.

Borgias et al. (1989) describe the complexation of the same metals ($Ga^{3+}$ and $Al^{3+}$) using the siderophore desferrioxamine B (DFO-B) and the purification of the complexes by means of cation exchange H PLC. The kinetics of complex formation was studied intensively. Jain et al. (2017) describe the column chromatographic separation by means of a reverse-phase C18 chromatography column during the selective sorption of Ga(III) using DFO-B.

US20120325740A1 also describes the complexation by means of siderophores, wherein siderophore-producing bacteria are immobilised on a column material, a filter, or a porous surface. The bacteria used are halophilic bacteria (preferring a salt-rich environment). A disadvantage of this method is that it is complex and, above all, prone to failures, since the bacteria require very defined living conditions. Another disadvantage is that the throughput of such a process is relatively small, since the amount of siderophore provided per surface area or per unit of volume is limited, not least due likewise to the living requirements of the bacteria, which only allow a certain bacterial density. Moreover, the bacteria are genetically modified so that siderophore production is not so low as to be uneconomical.

Hernlem et al. (1999) study complex formation constants for the siderophore desferrioxamine B (FDO-B) with metals other than iron.

Gladyshev et al. (2015), Liu et al. (2017), Nusen et al. (2016) and Roosen et al. (2017) describe recovering various metals from industrial wastewater using alternative chemical processes such as solvent extraction, ion exchange, or precipitation.

Processes known from the prior art, such as solvent extraction, ion exchange, fractional precipitation, or electrochemical deposition, are ecologically disadvantageous since they are based on chemically produced reagents.

Furthermore, the use of organic solvents requires additional method steps to remove them and thus increases the process costs.

So far, environmentally friendly variants of metal recovery from industrial wastewater have not been available. It would be more environmentally friendly, inter alia, to avoid toxic chemicals and organic solvents (e.g. during solvent extraction), to use biodegradable substances (e.g. the complexing agents), or to develop a process having lower energy requirements (compared to electrochemical processes).

One approach is the enrichment of gallium from multi-metallic solutions by means of selective bonding to foams in a continuous, solvent-free counter-current method, as described by Kinoshita et al. (2011). The disadvantage is that the method has not yet reached industrial maturity. Above all, it is only a method for the enrichment of Ga from a multi-metallic solution, but not for a clean separation. Contamination with other metals allows only very limited further use of the enriched gallium. Another disadvantage is that the surfactants required for foam formation have to be produced chemically and the process is therefore not very environmentally friendly.

The development of a general method for separating metals from industrial wastewater is no simple matter, since the actual composition of such industrial wastewater is neither completely known nor is it constantly the same. Depending on the industrial sector and company, the composition of industrial wastewater usually varies greatly. It is therefore difficult to develop a method that can be used generally for all types of industrial wastewater.

The technical problem addressed by this invention is that of providing a method for recovering metals from industrial wastewater. This method is intended to be usable for industrial wastewater from various branches of industry; it is therefore intended to be a general method. This method is intended to be environmentally friendly, economically advantageous, and able to be carried out at low temperatures (max. 50° C.). It must also comprise efficient recovery of the complexing agents used in order to be economically practical. The efficiency of metal recovery is intended to be as high as possible.

Furthermore, the process is also intended to be usable for the lowest possible metal concentrations, i.e. for diluted industrial wastewater.

The invention relates to a multi-step method for the selective, environmentally friendly and economical recovery of non-ferrous metals from industrial wastewater.

An object of the invention is therefore a method for recovering non-ferrous metals from industrial wastewater, comprising:

A: complexing the metal ions of the metal to be recovered by adding siderophores to the industrial wastewater;
B: separating the metal-siderophore complex;
C: releasing the metal from the metal-siderophore complex;
D: separating the metal;
E: recovering the siderophore; and
F: separating the siderophore.

According to the invention, a siderophore-metal complex is formed (A) when the siderophores are added to the metal-containing solution. The metal-siderophore complex is separated in B, the complexed metal is released in the subsequent step C.

In D the metal is separated.

According to the invention, in E the siderophore is recovered, separated (F) and thus re-emerges from the process predominantly unconsumed.

The process is therefore economical, cost-effective and environmentally friendly.

The process of the present invention can also be carried out for diluted industrial wastewater, i.e. at low concentrations of the metal to be recovered (<40 mg/L, in particular 1 to 30 mg/L, preferably also below 20 mg/L).

The method according to the invention is advantageously selective with respect to common contaminants such as Zn, Cu, Cd, Pb, Ni, alkali metals and alkaline earth metals.

The metals to be recovered in industrial wastewater are usually present as metal ions.

According to the invention, "metals to be recovered" or "metals" are always to be understood as the corresponding metal ions, and not limited to a single valency.

Siderophores are a group of complexing agents. Siderophores (Gr. sideros=iron, Gr. phorein=carry) are water-soluble organic substances of low molecular weight that are synthesised by microorganisms and plants and are biodegradable. They bond Fe(III) ions with high specificity and affinity to form stable chelate complexes and are responsible for transporting iron into the cell. After the iron ions have been complexed, the loaded siderophores are taken up again by the cells of the producers via specific transport systems. Since the complex formation constant of the siderophores for Fe(II) ions is much lower than for trivalent iron, the metal ion is released from the complex after reduction to iron(II). Various substances belong to the group of siderophores: desferrioxamines such as desferrioxamine B (DFO-B) and desferrioxamine E (DFO-E), marine siderophores having fatty acid groups (referred to here as fatty acid-containing siderophores) such as marinobactins, aquachelins, amphibactins, ochrobactins and synechobactins, but also marine siderophores without fatty acid groups such as petrobactin. The following structures show some of these and other representatives of the siderophores.

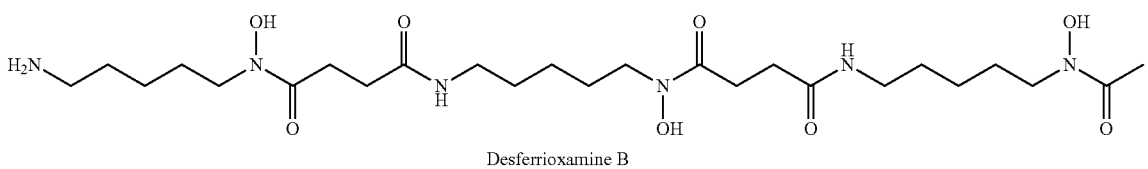

Desferrioxamine B

-continued
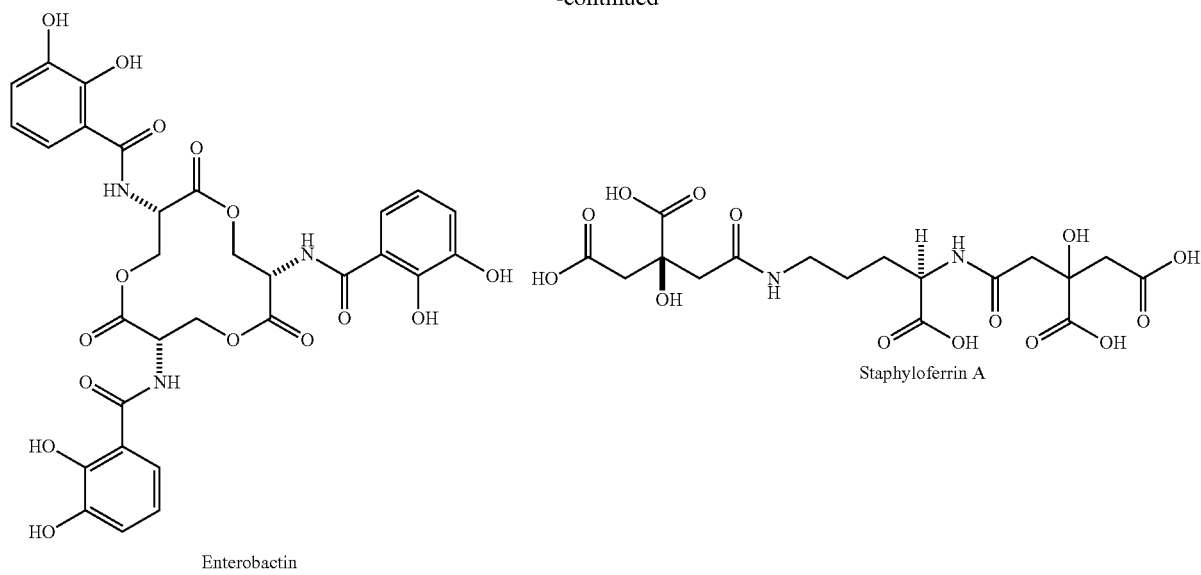
Enterobactin
Staphyloferrin A
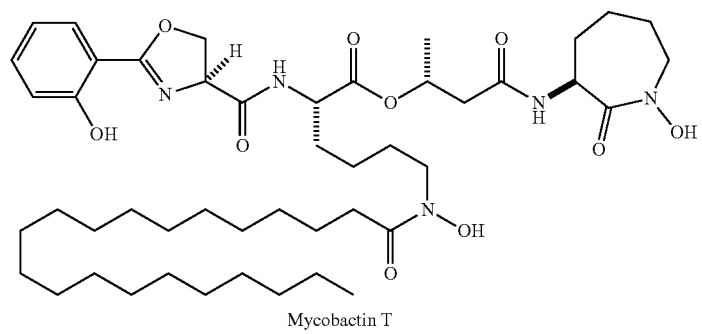
Mycobactin T
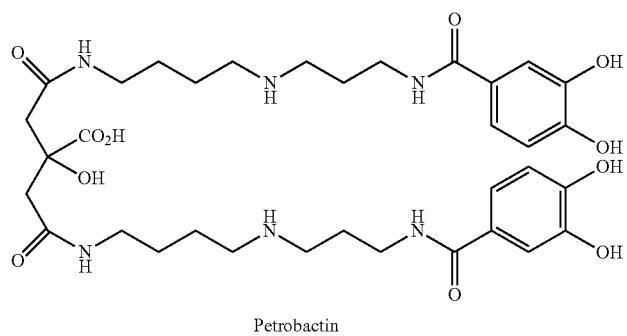
Petrobactin -continued
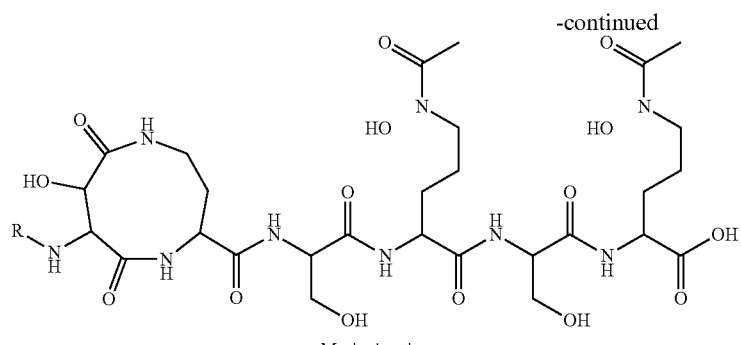
Marinobactins
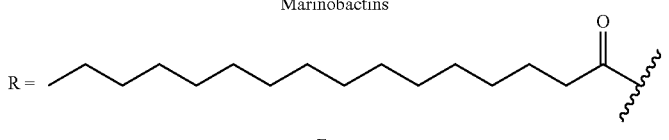
E
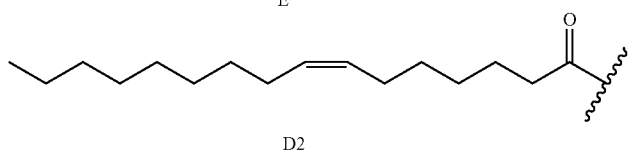
D2
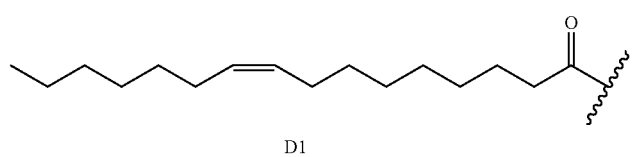
D1
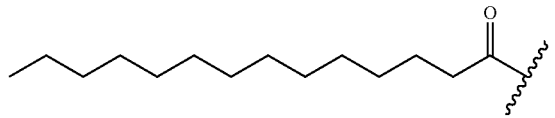
C
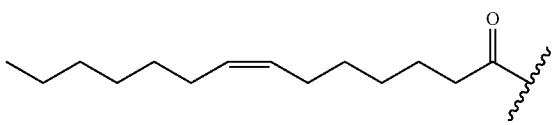
B
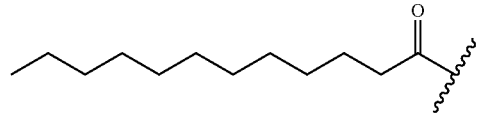
A -continued
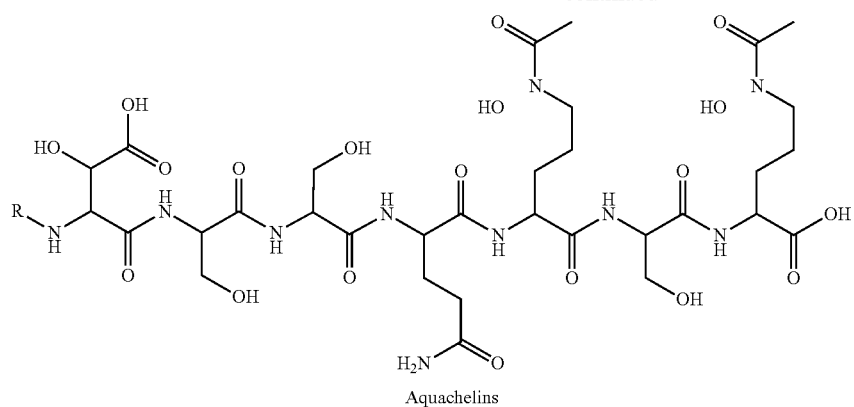
Aquachelins
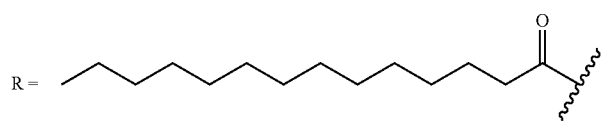
D
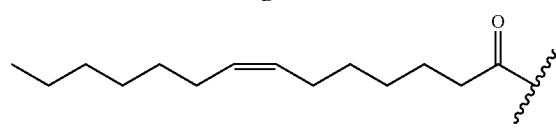
C
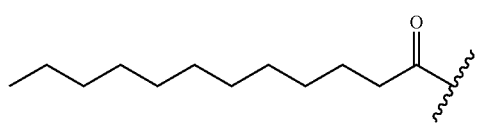
B
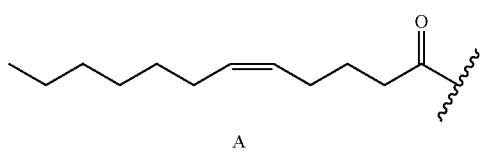
A
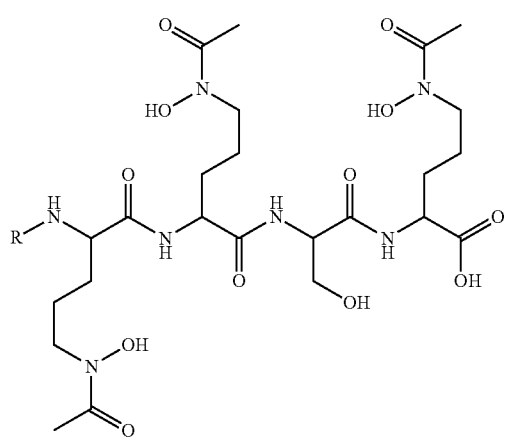
Amphibactins
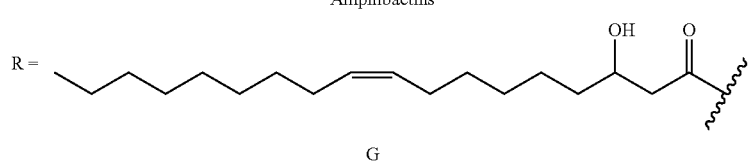
G -continued
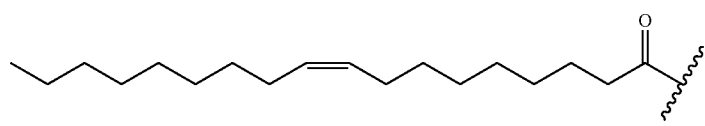
I
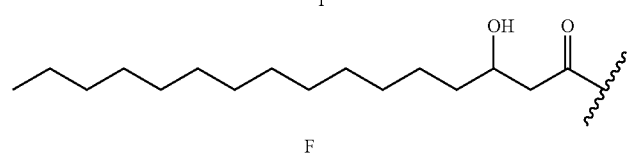
F
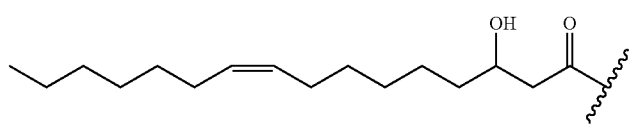
C
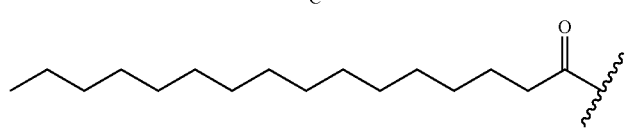
H
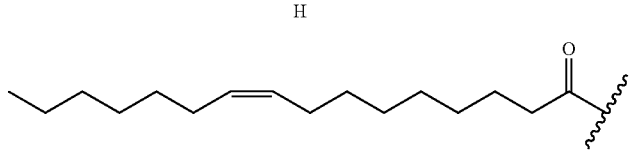
E
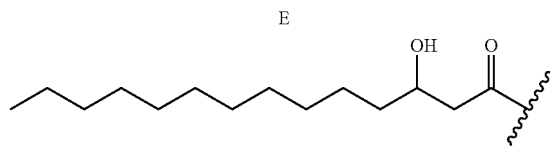
B
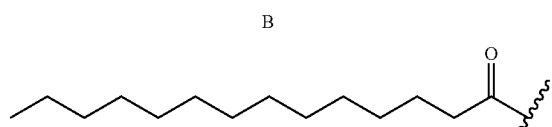
D
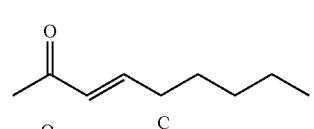
C
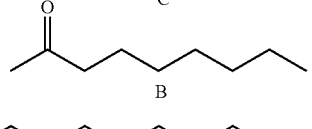
B
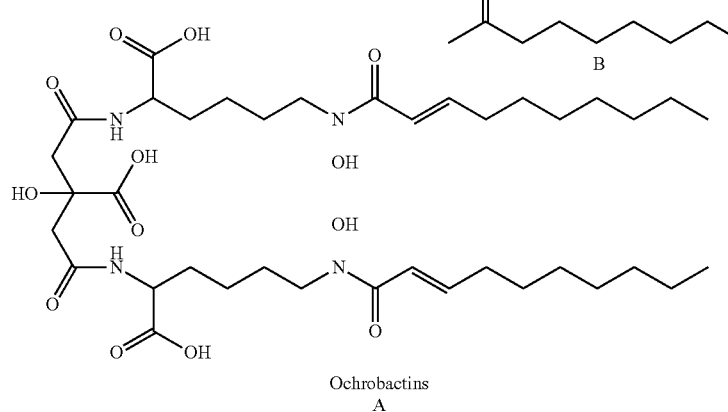
Ochrobactins
A -continued

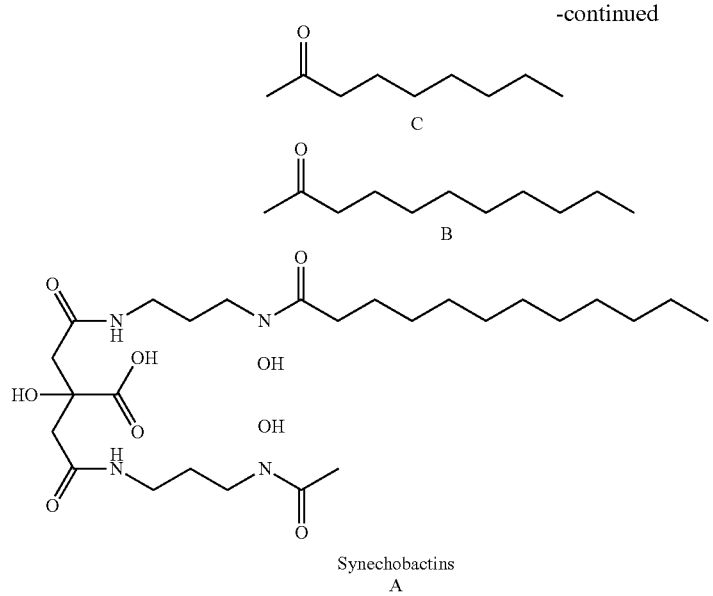

Synechobactins A

As can be seen from the structural formulae of the siderophores, siderophores contain a plurality of polar groups, in particular carbonyl, hydroxyl, amino, amide or hydroxam, which are suitable for complexing metals.

Siderophores themselves are inherently selective with respect to metals such as Ga, In, Ge(IV), Fe(III) or V compared to e.g. other divalent cations such as alkaline earth metals (Mg, Ca), Cu, Zn, Ni or monovalent alkali metals (Na, K). Siderophores also have this high selectivity with respect to Ga, In, Ge(IV), Fe(III) and V compared to anionic metal forms such as arsenite ($AsO_2^-$), arsenate ($AsO_4^{3-}$), chromate ($CrO_4^{2-}$), selenate ($S2O_4^{2-}$), or selenite ($SeO_3^{2-}$). In the case of a wastewater solution which contains, for example, Fe, Ga and In, the selectivity of the siderophores behaves in the order $Fe^{3+}>Ga^{3+}>In^{3+}$.

According to the invention, siderophores and the salts thereof are used as complexing agents. The siderophores are preferably selected from desferrioxamines and fatty acid-containing siderophores and the salts thereof.

In one embodiment, the desferrioxamines are selected from desferrioxamine B (DFO-B) and desferrioxamine E (DFO-E) and the salts thereof. In another embodiment, the fatty acid-containing siderophores are selected from marinobactins, aquachelins, amphibactins, ochrobactins and synechobactins and the salts thereof.

In order for the process to be usable on a larger scale, the amount of complexing agent must not be impractically high, i.e. the amount of siderophore that has to be added to the industrial wastewater for the complexed metal to be recovered must be as small as possible. To achieve this, depending on the metal, the complexation capacity of the siderophore must be correspondingly high. This is all the more important for diluted industrial wastewater, since otherwise an excessive amount of siderophore must be added to the industrial wastewater. It is advantageous in the invention that, depending on the metal and its molar mass, this complexation capacity is very high for iron and gallium using the example of desferrioxamines (100-130 mg of metal per g of siderophore).

According to the invention, the siderophores are recovered in the process, and therefore the process is more cost-effective than other processes. In addition, the process is environmentally friendly because the siderophores are produced by microorganisms or plants and are ultimately also biodegradable. In contrast, other synthetically produced chemicals which are otherwise used are difficult to degrade and sometimes toxic.

It is advantageous for the efficiency of metal recovery throughout the entire process to be high at >90%.

It is advantageously not necessary to supply heat in order to carry out the method according to the invention. It is possible to carry out the method at ambient temperature. The temperature therefore does not exceed 50° C. in any of the process steps. The ambient temperature is preferably in the range of from 10 to 50° C. The advantage of these low temperatures is that no heating is required in the individual steps and that the process is thus more energy-efficient, more cost-effective and ultimately more environmentally friendly than other processes.

According to the invention, the metals to be recovered are non-ferrous metals. These are selected in particular from Ga, In, Sc, Pu, Co, Ge, V, Al, Mn, Th, Ti, Zr, Hf, Nb, Ta, Mo, Bk, Eu, Dy, Pa, Gd, Yb, Ce, La, Rh, Tl, Bi and Pd. These are preferably present as ions, selected from Ga(III), In(III), Sc(III), Pu(IV), Co(III), Ge(IV), V(IV), Al(III), Mn(III), Th(IV), Ti(IV), Zr(IV), Hf(IV), Nb(V), Ta(V), Mo(IV), Bk(III), Eu(III), Dy(III), Pa(IV), Gd(III), Yb(III), Ce(III), La(III), Rh(III), Tl(III), Bi(III) and Pd(II).

In a preferred embodiment of the invention, the metal to be recovered is selected from Ga, In, Sc, Pu, Co and Ge and is present as ions, selected from Ga(III), In(III), Sc(III), Pu(IV), Co(III) and Ge(IV). In one embodiment, the metal to be recovered is selected from Ga and In.

In the first variant of the method according to the invention described below, the steps are carried out in the order A, B, C, D, E and F. In the second variant of the method according to the invention described later, the first steps are carried out in the order A, B and C. In this variant, the order of steps D, E and F can vary, as described below.

The step "releasing the metal from the metal-siderophore complex" (C) according to the invention is executed in a first variant of the method according to the invention by adding Fe(III) ions. As a result, >90% of the metal in the metal-siderophore complex is advantageously replaced by Fe(III). The free metal to be recovered and the Fe(III)-siderophore complex are now present in the solution. In this embodiment, the siderophore is recovered (E) after the metal to be recovered has been separated (D), by adding a reductant and/or a chelator. In particular, the recovery (E) takes place:

a. by adding a reductant to the Fe(III)-siderophore complex, as a result of which the Fe(III) is reduced to Fe(II), the Fe(II) is decomplexed and is finally free as Fe(II);

b. by adding a reductant, as described in a., and additionally complexing the formed Fe(II) by adding a chelator, as a result of which the Fe(II) in the solution is bound and the equilibrium of the decomplexation is shifted in the direction of higher yield; or c. by adding an excess of a chelator, which complexes Fe(III) in competition with the siderophore.

Consequently, in a. and b. Fe(III) is reduced to Fe(II), and the Fe(II) formed is decomplexed due to the lower complex formation constant of the siderophores for Fe(II) compared to Fe(III).

In c. this decomplexation takes place without reduction only by adding the added chelator in excess. The chelator complexes the Fe(III) in competition with the siderophore. The excess of the chelator or its higher complex formation constant shifts the recovery of the siderophore to higher yields. Consequently, Fe(III) is released from the Fe(III)-siderophore complex and bound as an Fe(III)-chelator complex. For example, adding a 4-fold excess of EDTA results in more than 95% release of the siderophore and formation of the Fe(III)-EDTA complex.

The chelator optionally used in E is not a siderophore, but rather an unspecific, stable complexing agent which is conventional for a person skilled in the art, such as EDTA (ethylenediaminetetraacetic acid), 1,10-phenanthroline or ferrozine. In this case, the chelator complexes either Fe(II) or Fe(III) or both.

The Fe(III) used in C in this first variant of the method according to the invention is preferably selected from $FeCl_3$.

In this first variant of the method according to the invention, it is sufficient in C to leave the solution at ambient temperature for exchanging the metal to be recovered with Fe(III) in the complex.

In the case of acidic industrial wastewater (in particular pH 2.0-3.0), the metal (e.g. gallium) is decomplexed in one embodiment by adding two to four times the amount of Fe(III) (based on the amount of the metal to be separated) at ambient temperature. In this case, an exchange of >90% is usually achieved within 24 hours.

The ambient temperature is in particular selected as above.

In one embodiment, regardless of the pH value of the industrial wastewater, the solution is treated with ultrasound to accelerate the exchange. The ultrasound treatment takes place in particular for 0.5-30 minutes and/or at 10-50° C.

Suitable reductants for the reduction in step E are selected from $H_2SO_3$, ascorbic acid, and the salts thereof. In particular, the reductant is selected from $Na_2SO_3$ and $NaHSO_3$.

The metal to be recovered is released (C) according to the invention from the metal-siderophore complex in a second variant of the method according to the invention by adding a chelator.

The chelator used in this case (like the chelator optionally used in step E of the first variant) is not a siderophore, but rather an unspecific, stable complexing agent which is conventional for a person skilled in the art, such as EDTA (ethylenediaminetetraacetic acid). The chelator is able to complex the metal to be recovered in its present valence, i.e. the present charge. The chelator is either used in a molar excess compared to the siderophore and/or the chelator is selected such that the complex formation constant for the chelator and metal to be recovered is greater than that for the siderophore and metal to be recovered. In this second variant of the method according to the invention, the metal to be recovered changes from the metal-siderophore complex into a metal-chelator complex and the siderophore is present as a complexing agent without metal. In this variant, the siderophore is recovered (E) and separated (F) in this manner. In other words, C and E are preferably carried out simultaneously.

In D, the metal is separated in this variant in the simplest form as a metal-chelator complex. In this case, D and F (separation of metal and siderophore) are preferably carried out simultaneously. In addition to simplifying the method, the advantage of the separation as a metal-chelator complex is that the metal in the metal-chelator complex (e.g. gallium-EDTA) is present in a stabilised form and can therefore be used effectively in industry.

Alternatively, the metal is isolated from the metal-chelator complex in D. For this purpose, Fe(III) ions are preferably added as described in step C of the first variant of the method according to the invention. It makes sense to separate the siderophore (F) here before adding the Fe(III) ions.

According to the invention, purification or rather separation using methods known per se takes place in method steps B, D and F.

In one embodiment, in at least one of the separation steps B, D and F, the method for separating the components is selected from chromatographic methods. Chromatography using a reverse-phase chromatography resin is preferred. In particular, this is selected from reverse-phase C18 and reverse-phase C8 resins. In one embodiment, these are resins from chromatography columns having an extra dense bonding (XDB) stationary phase made of silica coated with dimethyl-n-octadecylsilane (for example "ZORBAX Eclipse XDB-C18 4.6×150 mm, 5 µm"). In addition or in further embodiments, the methods for separating the components in at least one of the separation steps B, D and F are selected from:
  solid phase extraction;
  precipitation;
  filtration and/or nanofiltration;
  immobilisation of the siderophores on a carrier material;
  concentration of the metal-siderophore complexes by foaming and collecting the foam;
  and combinations of the above-mentioned methods.

Particularly preferably, in at least one of the separation steps B, D and F, the method for separation is selected from:
  chromatographic methods;
  precipitation;
  filtration and/or nanofiltration;
  immobilisation of the siderophores on a carrier material; and
  concentration of the metal-siderophore complexes by foaming and collecting the foam; and combinations of the above-mentioned methods.

Preferably, in each of the separation steps B, D and F, at least one of the methods described above is used.

All combinations of the above-mentioned methods are possible. The following combinations in particular are suitable:
  immobilisation of the siderophores on a carrier material together with filtration and/or nanofiltration; and precipitation together with filtration and/or nanofiltration.

The principle of the precipitation is based on a reduction in the solubility of the molecule to be precipitated in the present solvent, for example by lowering the temperature. For example, it is possible to precipitate desferrioxamine E and B (DFO-E and DFO-B) in water by lowering the temperature from 50° C. to <20° C.

Alternatively, the precipitation takes place by adding a water-soluble solvent in which the molecule dissolves very poorly. For example, it is possible to precipitate desferrioxamine E from an aqueous solution by adding acetone.

In one embodiment, in step F, Fe(II) is separated by adding sulphide ions or phosphate ions. This results in precipitation as iron(II) sulphide or iron(II) phosphate.

As already mentioned at the outset of the discussion of the prior art, the principle of immobilising siderophores is described in the literature. Reactive groups in the siderophore (e.g. the free $NH_2$ groups of DFO-B) can, when immobilised at reactive groups of a carrier material (for example carboxyl-functionalised polystyrene carrier material or nylon 6,6), react to form covalent bonds (such as amide bonds) [ref. Takagai et al. (2007)]. A non-covalent immobilisation of siderophores such as desferrioxamine on carrier materials such as silica is also known [ref. Su et al. (2011)]. Such carrier materials are present in particular in particulate form (beads, etc.) or in the form of fibres.

The principle of concentrating the metal-siderophore complexes by foaming and collecting the foam is based on the fact that the metal-siderophore complexes, for example the metal complexes with DFO-B, DFO-E or marinobactin, can be bound to foams. This often requires an additional foaming agent (surfactant) (cf. ref. Kinoshita et al. (2011)), which is most commonly chemically synthesised.

In the case of fatty acid-containing siderophores, such as marinobactins, aquachelins, amphibactins, ochrobactins or synechobactins, it is advantageous that, because of their amphiphilic structure, they are themselves surface-active and thus act as foaming agents. They foam very well. In the case of these fatty acid-containing siderophores, it is consequently possible to reduce the amount of chemically produced surfactants to be added, which in turn facilitates regeneration and purification of the siderophore and makes the process more environmentally friendly.

In the next step, the foam is collected. The foam having the concentrated metal-siderophore complex is now preferably led to step C of the process according to the invention ("releasing the metal from the metal-siderophore complex by adding Fe(III) ions and forming an Fe(III)-siderophore complex") and from there is treated further according to the method of the invention.

In a variant of the method according to the invention, the method can be combined with further conventional methods, depending on the individual case.

In the case of industrial wastewater contaminated with $Fe^{3+}$, it is possible, for example, to complex the iron ions and gallium ions with siderophores such as DFO-B or DFO-E by using an excess of the siderophore at the start of the method according to the invention. After the metal-siderophore complexes have been separated in step B of the method according to the invention (these are now the iron-siderophore complex and for example a gallium-siderophore complex), step C of the method, i.e. the addition of further $Fe^{3+}$ ions, completes the method as described at the outset.

Alternatively, it is possible to precipitate $Fe^{3+}$ in a pretreatment step, i.e. before step A of the method according to the invention, either as iron arsenate or as iron phosphate in the event that arsenate ions or phosphate ions are also present in the industrial wastewater. The precipitation would be triggered by a change in the pH value of the industrial wastewater.

In the case of industrial wastewater contaminated with several different metals, a distinction is made between metals for which siderophores are selective (e.g. Ga, In, Ge(IV), Fe(III) or V) and metals that are not preferentially complexed (such as alkali metals and alkaline earth metals, P, S, Si, Zn or Pb). In one embodiment, metals that are not preferentially complexed are separated in step B (separation of the metal-siderophore complex).

In one embodiment, different metals which are preferentially complexed are separated using known methods such as chromatography, sequential precipitation using different precipitants and/or complexation using different complexing agents.

Another object of the invention is the use of siderophores for recovering non-ferrous metals from industrial wastewater in the method according to the invention.

In a preferred embodiment of this use, the non-ferrous metals are selected from Ga, In, Sc, Pu, Co, Ge, V, Al, Mn, Th, Ti, Zr, Hf, Nb, Ta, Mo, Bk, Eu, Dy, Pa, Gd, Yb, Ce, La, Rh, TI, Bi and Pd.

In order to implement the invention, it is also expedient to combine the above-described designs of the invention, as well as the embodiments and features of the claims with one another in any configuration.

The project that led to this patent application was funded by the European Union's "Horizon 2020 research and innovation program"—Marie Sklodowska-Curie grant agreement No 704852.

The invention is explained in the following figures and embodiments, without limiting the invention thereto.

FIG. 1 shows an embodiment of the first variant of the multi-step method according to the invention for recovering non-ferrous metals from industrial wastewater on the basis of the exemplary use of the complex-forming properties of the siderophore desferrioxamine E and a purification method by means of C18 reverse-phase chromatography.

EMBODIMENTS

1. First Variant of the Method According to the Invention

Method Description for Industrial Wastewater Having Low Ga Concentration (4 mg/L) Using DFO-E:

0.05 mL of a 2 mM solution of desferrioxamine-E is added to 1.95 mL of industrial wastewater having a low Ga concentration and the resulting solution is stirred for 15 minutes at room temperature. 100 µL of this solution is pumped into a ZORBAX Eclipse XDB-C18 4.6×150 mm, 5 µm, a commercially available chromatography column, at a solvent flow rate of 0.8 mL/min. The working temperature is 25° C. 10 mM $KH_2PO_4$ (solvent A) and acetonitrile (HPLC grade, solvent B) are used as solvents in the gradient mode. To reduce process costs, it is also possible to use solvent A in a lower concentration in the gradient mode, specifically 1 mM $H_3PO_4$. The proportion of solvent B increases from 10% to 15% within 10 minutes. After the elution follows an equilibration phase of 20 minutes with a solvent mixture of 90% 10 mM $KH_2PO_4$ and 10% acetonitrile.

Contaminants in the industrial wastewater were collected in a fraction between 2.5 and 4.5 minutes (1.6 mL). The gallium-desferrioxamine-E complex was collected as a fraction at an elution time of between 8 and 10 minutes (1.6 mL).

The yield of the gallium desferrioxamine E complex was 92.0%±2.5% based on the gallium originally contained. 4.75 µL of an aqueous 2 mM $Fe^{3+}$ solution is added and the pH is brought to a value of 2.5±0.3 using 0.1 M HCl. The total volume is now 1.6475 mL. After ultrasound treatment for 12 hours and at a temperature <50° C., 100 µL of this solution is pumped onto a "ZORBAX Eclipse XDB-C18 4.6×150 mm, 5 µm" chromatography column (commercially available) at a solvent flow rate of 0.8 mL/min. The fraction at an elution time of 2.5-4.5 minutes contains the gallium to be recovered. The gallium yield is >90%. The fraction at 8-10 minutes contains the Fe-desferrioxamine-E complex in a yield of 91%. The total volume of this latter fraction is 1.6 mL. 28 µL of an aqueous 10 mM $Na_2SO_3$ solution is added to the solution and the pH value is adjusted to 3.5±0.3 using 0.5 M HCl. Another 28 µL of a 2 mM aqueous ethylenediaminetetraacetic acid solution (EDTA) is added. After the solution has stood for 24 hours at room temperature, the solution is placed on a "ZORBAX Eclipse XDB-C18 4.6× 150 mm, 5 µm" chromatography column and chromatographed at a solvent flow rate of 0.8 mL/min. The fraction between the elution time of 2.5 and 4.5 minutes contains the waste. The regenerated desferrioxamine-E is collected in the fraction between 16.5 and 18.5 minutes.

Method Description for Industrial Wastewater Having Low In Concentration (10 mg/L) Using DFO-E:

0.09 mL of a 2 mM solution of desferrioxamine-E is added to 1.91 mL of industrial wastewater containing 0.087 mM indium and the resulting solution is stirred for 15 minutes at room temperature. 100 µL of this solution is placed on a chromatography column. The remaining steps are carried out as in the experiment for low Ga concentrations using DFO-E described above. In the case of the industrial wastewater containing indium, the following other contaminating elements were contained in ion form: Na, K, Ca, Mg, P, S, Si, Zn and Pb.

Method Description for Industrial Wastewater Having Higher Ga Concentration (40 mg/L) Using DFO-E:

A similar experiment of the whole process is carried out using 1.6 mL of an industrial water sample having a Ga concentration of 40 mg/L. 0.4 mL of a 2 mM aqueous desferrioxamine-E solution is added to the solution. All steps of the above-mentioned method are employed in a similar manner. The only difference lies in the amounts of reagents used: 41.6 µL of a 1 mM $Fe^{3+}$ solution and later 28 µL of a 10 mM solution of $Na_2SO_3$ are employed.

Method Description for Industrial Wastewater Having Low Ga Concentration (4 mg/L) Using DFO-B
and
Method Description for Industrial Wastewater Having Higher Ga Concentration (40 mg/L) Using DFO-B:

Gallium is recovered from both industrial wastewater having a higher Ga concentration and from industrial wastewater having a lower Ga concentration in a similar manner to the above methods, using desferrioxamine-B instead of desferrioxamine-E. All method steps are employed in a similar manner except for the fractions that are collected. The Ga-desferrioxamine-B complex and also the Fe-desferrioxamine-B complex are collected at an elution time of 4.5-6.5 minutes instead of 8-10 minutes.
M=mol/L.

2. Second Variant of the Method According to the Invention

Method Description for Industrial Wastewater Having Low Ga Concentration (4 mg/L) Using DFO-E:

0.05 mL of a 2 mM solution of desferrioxamine-E is added to 1.95 mL of industrial wastewater having a low Ga concentration (4 mg/L) and the resulting solution is stirred for 15 minutes at room temperature. 100 µL of this solution is pumped into a ZORBAX Eclipse XDB-C18 4.6×150 mm, 5 µm, a commercially available chromatography column, at a solvent flow rate of 0.8 mL/min. The working temperature is 25° C. 10 mM $KH_2PO_4$ (solvent A) and acetonitrile (HPLC grade, solvent B) are used as solvents in the gradient mode. The proportion of solvent B increases from 10% to 15% within 10 minutes. After the elution follows an equilibration phase of 20 minutes with a solvent mixture of 90% 10 mM $KH_2PO_4$ and 10% acetonitrile.

Contaminants in the industrial wastewater were collected in a fraction between 2.5 and 4.5 minutes (1.6 mL). The gallium-desferrioxamine-E complex was collected as a fraction at an elution time of between 8 and 10 minutes (1.6 mL). The yield of the gallium desferrioxamine E complex was 92.0%±2.5% based on the gallium originally contained.

2.1 µL of a 10 mM ethylenediaminetetraacetic acid solution (EDTA) is added to the 1.6 mL of the gallium-desferrioxamine-E fraction and stirred at room temperature for 24 hours. Then 100 µL of this solution is pumped onto a "ZORBAX Eclipse XDB-C18 4.6×150 mm, 5 µm" chromatography column (commercially available) at a solvent flow rate of 0.8 mL/min. The working temperature during the chromatography is 25° C. 10 mM $KH_2PO_4$ (solvent A) and acetonitrile (HPLC grade, solvent B) are used as solvents in the gradient mode. The proportion of solvent B increases from 10% to 15% within 10 minutes. After the elution follows an equilibration phase of 20 minutes with a solvent mixture of 90% 10 mM $KH_2PO_4$ and 10% acetonitrile. The fraction at an elution time of 3.5-5.5 minutes contains the gallium-EDTA complex. The regenerated desferrioxamine-E is collected in the fraction between 16.5 and 18.5 minutes. 93% (±1.5%) of the gallium-EDTA complex and 92% (±2.5%) of the desferrioxamine-E were recovered compared to the amounts used.

The isolated gallium-EDTA complex can be used directly for the production of GaN wafers or GaAs wafers.

To decomplex the gallium-EDTA complex, 2.56 µL of a 1 mM Fe(III) solution is added and is stirred at room temperature for 24 hours. This results in the gallium being released and the Fe(III)-EDTA complex being formed.

3. Method Step B: Chromatography to Separate the Metal-Siderophore Complex

Optimised Chromatography Resin to Maximise Loading and Minimise Solvent Loss—Using a Reverse-Phase Chromatography Resin When searching for optimised chromatography resins for separating or purifying Ga-siderophore complexes, the following optimisation was carried out.

DFO-B or DFO-EA is added in an equimolar manner (with respect to the concentration of Ga) to a solution containing the various metals Ga, Zn, Ca, Cu, Mg and As (0.25 mM-1.0 mM each). The mixture is incubated for 24 hours at 30° C. while being stirred. Then 5 mL or 8 mL of this solution is injected into chromatography columns, each containing different packing materials (chromatography resins). The fractions containing the Ga-siderophore complex are collected during the chromatography. The purity and the consumption of acetonitrile per mmol of the isolated Ga-siderophore complex were calculated. The results are shown in Table 1.

TABLE 1

Comparison of different chromatography columns for purifying/separating Ga-siderophore complexes

| Chromatography column | Carbon proportion [%] | Mobile phase/ Solvent | Comment | MeCN consumption [L per mmol of complex] | Purity of the Ga-siderophore complex [%] |
|---|---|---|---|---|---|
| Zorbax 150 mm | 10 | 10% acetonitrile (MeCN) with gradient | DFOB + Ga 0.25 mM | 1.706 | 67.3 |
| | | | DFOE + Ga 0.25 mM | 2.126 | 95.5 |
| | | | EDTA B 0.5 + 3 mM free dfo | 0.598 | 99.0 |
| | | | EDTA E 0.5 + 3 mM free dfo | 1.112 | 99.0 |
| Zorbax 250 mM | 10 | 2.5% MeCN | DFOB + Ga m as 1 mM 5 ml | 0.132 | 96.9 |
| | | 10% MeCN without gradient | DFOE + Ga m as 1 mM 5 ml | 0.438 | 98.6 |
| | | 10% MeCN with gradient | EDTA B 0.5 + 3 mM 5 ml | 0.448 | 99.0 |
| | | | EDTA E 0.5 + 3 mM 5 ml | 1.364 | 99.0 |
| YMC C18 | 20 | 10% MeCN without gradient | DFOB + Ga m as 1 mM 8 ml | 0.288 | 83.0 |
| | | | DFOE + Ga m as 1 mM 8 ml | 0.448 | 100.0 |
| | | 10% MeCN with gradient | EDTA B 0.5 + 3 mM 5 ml | 0.938 | 99.0 |
| | | | EDTA E 0.5 + 3 mM 5 ml | 1.472 | 99.0 |
| Reprosil-pur 200 ODS-3 | 12 | 10% MeCN with gradient | DFOB + Ga m as 1 mM 5 ml | 1.228 | 74.3 |
| | | | DFOE + Ga m as 1 mM 5 ml | 0.994 | 92.5 |
| | | | EDTA B 0.5 + 3 mM 5 ml | 0.966 | 99.0 |
| | | | EDTA E 0.5 + 3 mM 5 ml | 2.032 | 99.0 |
| Reprospher 100 C18-DE | 16 | 2.5% MeCN | DFOB + Ga m as 1 mM 8ml | 0.112 | 95.8 |
| | | 10% MeCN without gradient | DFOE + Ga m as 1 mM 8 ml | 0.358 | 99.6 |
| | | 10% MeCN with gradient | EDTA B 0.5 + 3 mM 5 ml | 0.518 | 99.0 |
| | | | EDTA E 0.5 + 3 mM 5 ml | 1.32 | 99.0 |
| Ecoprep 120 C18-NE | 24 | 10% MeCN with gradient | DFOB + Ga m as 1 mM 5 ml | 1.844 | 79.1 |
| | | | DFOE + Ga m as 1 mM 5 ml | 1.112 | 89.0 |
| | | | EDTA B 0.5 + 3 mM 5 ml | 2.32 | 99.0 |
| | | | EDTA E 0.5 + 3 mM 5 ml | 1.362 | 99.0 |
| ReproSil Saphir 1000 C18 | 02. Jan | 1% MeCN | DFOB Ga + As + Me 0.25 mM 5 ml | 0.15 | 61.7 |
| | | 2.5% MeCN | DFOE Ga + As + Me 1 mM 5 ml | 0.154 | 97.3 |
| | | 10% MeCN with gradient | EDTA B 0.5 + 3 mM 5 ml | 2.32 | 99.0 |
| | | | EDTA E 0.5 + 3 mM 5 ml | 1.362 | 99.0 |
| ProSphere 300 C18 | 4 | 2.5% MeCN | DFOB Ga + As + Me 0.5 mM 5 ml | 0.536 | 60.1 |
| | | 5% MeCN | DFOE Ga + As + Me 1 mM 5 ml | 0.272 | 98.2 |
| | | 10% MeCN with gradient | EDTA B 0.5 + 3 mM 5 ml | 0.904 | 99.0 |
| | | | EDTA E 0.5 + 3 mM 5 ml | 0.84 | 99.0 |

All chromatography columns were 4.6 mm in diameter. Except for ZORBAX (150 mm and 250 mm) all columns had a length of 250 mm. The ZORBAX and YMC C18 TRIART columns were filled with a chromatography resin that had a particle size of 5 µm; the other resins had a particle size of 10 µm.

The best chromatography columns for purifying/separating a Ga-DFO-B complex are ZORBAX and REPROSPHER 100 C18-DE, as can be seen in Table 1. For a Ga-DFO-E complex, the best chromatography columns are REPROSIL SAPHIR 1000, PROSPHERE 300 C18 and REPROSPHER 100 C18-DE. REPROSPHER 100 C18-DE is the best column for the Ga-siderophore complexes having the DFO-B and/or DFO-E siderophores. During chromatography, this column results in high purity and low solvent consumption.

LITERATURE

Borgias, B.; Hugi, A. D.; Raymond Kenneth N.
Isomerization and Solution Structures of Desferrioxamine B Complexes of Al3+ and Ga3+1. Inorg.
Chem. 1989, 28, 3538-3545. doi:10.1021/i000317a029

Hernlem, B. J.; Vane, L. M.; Sayles, G. D.
The application of siderophores for metal recovery and waste remediation: Examination of correlations for prediction of metal affinities.
Water Res. 1999, 33, 951-960. doi:10.1016/S0043-1354(98)00293-0

Martinez, J. S.; Zhang, G. P.; Holt, P. D.; Jung, H.-T.; Carrano, C. J.; Haygood, M. G.; Butler, Alison.
Self-Assembling Amphiphilic Siderophores from Marine Bacteria.
Science 2000, 287, 1245-1247

Renard, G.; Mureseanu, M.; Galarneau. A.; Lerner. D. A.; Brunel, D.
Immobilisation of a biological chelate in porous mesostructured silica for selective metal removal from wastewater and its recovery.
New J. Chem. 2005, 29, 912. doi:10.1039/b500302b Takagai, Y.; Takahashi, A.; Yamaguchi, H.; Kubota, T.; Igarashi, S.
Adsorption behaviors of high-valence metal ions on desferrioxamine B immobilization nylon 6,6 chelate fiber under highly acidic conditions.
J. Colloid Interface Sci. 2007, 313 (1), 359-362

Zhang G.; Amin, S. A.; Kupper, F. C.; Holt, Pamela D.; Carrano, C. J.; Butler, A.
Ferric Stability Constants of Representative Marine Siderophores: Marinobactins, Aquachelins, and Petrobactin
Inorg Chem. 2009, 48 (23), 11466-11473

Kinoshita, T.; Ishigaki, Y.; Shibata, N.; Yamaguchi, K.; Akita, S.; Kitagawa, S.; Kondou, H.; Nii, S.
Selective recovery of gallium with continuous countercurrent foam separation and its application to leaching solution of zinc refinery residues
Sep. Purif. Technol. 2011, 78, 181-188

Su, B. L.; Moniotte, N.; Nivarlet, N.; Chen, L. H.; Fu, Z. Y.; Desmet, J.; Li, J. FI-DFO molecules@mesoporous silica materials: Highly sensitive and selective nanosensor for dosing with iron ions.
J. Colloid Interface Sci. 2011, 358 (1), 136-145

Nusen, S.; Chairuangsri, T.; Zhu, Z.; Cheng, C. Y.
Recovery of indium and gallium from synthetic leach solution of zinc refinery residues using synergistic solvent extraction with LIX 63 and Versatic 10 acid.
Hydrometallurgy 2016, 160, 137-146. doi:10.1016/j.hydromet.2016.01.007

Gladyshev, S. V.; Akcil, A.; Abdulvaliyev, R. A.; Tastanov, E. A.; Beisembekova, K. O.; Temirova, S. S.; Deveci, H.
Recovery of vanadium and gallium from solid waste by-products of Bayer process.
Miner. Eng. 2015, 74, 91-98. doi:10.1016/j.mineng.2015.01.011

Jain, R.; Cirina, F.; Kaden, P.; Pollmann, K.
Investigation of the Ga Complexation Behaviour of the Siderophore Desferrioxamine B.
Solid State Phenom. 2017, 262, 643-646. doi:10.4028/www.scientific.net/SSP.262.643

Liu, F.; Liu, Z.; Li, Y.; Wilson, B.P.; Liu, Z.; Zeng, L.; Lundstrom, M.
Recovery and separation of gallium(III) and germanium(IV) from zinc refinery residues: Part II: Solvent extraction.
Hydrometallurgy 2017, 171, 149-156. doi:10.1016/j.hydromet.2017.05.009

Roosen, J.; Mullens. S.; Binnemans, K.
Chemical immobilization of 8-hydroxyquinoline and 8-hydroxyquinaldine on chitosan-silica adsorbent materials for the selective recovery of gallium from Bayer liquor.
Hydrometallurgy 2017, 171, 275-284. doi:10.1016/j.hydromet.2017.05.026

The invention claimed is:

1. A method for recovering non-ferrous metals from industrial wastewater, comprising:
   A: complexing the metal to be recovered by adding siderophores to the industrial wastewater;
   B: separating the metal-siderophore complex;
   C: releasing the metal from the metal-siderophore complex;
   D: separating the metal;
   E: recovering the siderophore; and
   F: separating the siderophore,
   wherein either:
      C: releasing the metal from the metal-siderophore complex is executed via adding Fe(III) ions and forming an Fe(III)-siderophore complex; and
      E: recovering the siderophore is executed via adding a reductant and/or a chelator or
      C: releasing the metal from the metal-siderophore complex is executed via adding a chelator, as a result of which a metal-chelator complex is formed; and
      D: the metal is separated as this metal-chelator complex.

2. The method according to claim 1, wherein:
   C: releasing the metal from the metal-siderophore complex is executed via adding Fe(III) ions and forming an Fe(III)-siderophore complex; and
   E: recovering the siderophore is executed via adding a reductant and/or a chelator.

3. The method according to claim 2, wherein the reductant is selected from $H_2SO_3$, ascorbic acid and salts thereof.

4. The method according to claim 1, wherein:
   C: releasing the metal from the metal-siderophore complex is executed via adding a chelator, as a result of which a metal-chelator complex is formed; and
   D: the metal is separated as this metal-chelator complex.

5. The method according to claim 4, wherein the metal is selected from Ga, In, Sc, Pu, Co, Ge, V, Al, Mn, Th, Ti, Zr, Hf, Nb, Ta, Mo, Bk, Eu, Dy, Pa, Gd, Yb, Ce, La, Rh, Tl, Bi and Pd.

6. The method according to claim 1, wherein the metal is selected from Ga, In, Sc, Pu, Co, Ge, V, Al, Mn, Th, Ti, Zr, Hf, Nb, Ta, Mo, Bk, Eu, Dy, Pa, Gd, Yb, Ce, La, Rh, Tl, Bi and Pd.

7. The method according to claim 1, wherein the siderophores are selected from desferrioxamines and fatty acid-containing siderophores and salts thereof.

8. The method according to claim 7, wherein the siderophores are selected from desferrioxamine B (DFO-B), desferrioxamine E (DFO-E), marinobactins, aquachelins, amphibactins, ochrobactins and synechobactins and salts thereof.

9. A method for recovering non-ferrous metals from industrial wastewater, comprising:
   A: complexing the metal to be recovered by adding siderophores to the industrial wastewater;
   B: separating the metal-siderophore complex;
   C: releasing the metal from the metal-siderophore complex;
   D: separating the metal;
   E: recovering the siderophore; and
   F: separating the siderophore,
   wherein, in at least one of the separation steps B, D and F, the method for separation is selected from:
      chromatographic methods;
      solid phase extraction;
      precipitation;
      filtration and/or nanofiltration;
      immobilisation of the siderophores on a carrier material; and
      concentration of the metal-siderophore complexes by foaming and collecting the foam;
      and combinations of the above-mentioned methods.

10. The method according to claim 1, wherein the temperature is consistently between 10 and 50° C.

11. The method according to claim 1, wherein the metal is selected from Ga, In, Sc, Pu, Co, Ge, V, Al, Mn, Th, Ti, Zr, Hf, Nb, Ta, Mo, Bk, Eu, Dy, Pa, Gd, Yb, Ce, La, Rh, Tl, Bi and Pd, and wherein the siderophores are selected from desferrioxamines and fatty acid-containing siderophores and salts thereof.

12. The method according to claim 11, wherein the siderophores are selected from desferrioxamine B (DFO-B), desferrioxamine E (DFO-E), marinobactins, aquachelins, amphibactins, ochrobactins and synechobactins and salts thereof.

13. The method according to claim 11, wherein:
   C: releasing the metal from the metal-siderophore complex is executed via adding Fe(III) ions and forming an Fe(III)-siderophore complex; and
   E: recovering the siderophore is executed via adding a reductant and/or a chelator.

14. The method according to claim 13, wherein the reductant is selected from $H_2SO_3$, ascorbic acid and salts thereof.

15. The method according to claim 11, wherein:
C: releasing the metal from the metal-siderophore complex is executed via adding a chelator, as a result of which a metal-chelator complex is formed; and
D: the metal is separated as this metal-chelator complex.

16. The method according to claim 15, wherein the temperature is consistently between 10 and 50° C.

17. The method according to claim 11, wherein, in at least one of the separation steps B, D and F, the method for separation is selected from:
chromatographic methods;
solid phase extraction;
precipitation;
filtration and/or nanofiltration;
immobilisation of the siderophores on a carrier material; and
concentration of the metal-siderophore complexes by foaming and collecting the foam;
and combinations of the above-mentioned methods.

18. The method according to claim 11, wherein the temperature is consistently between 10 and 50° C.

19. The method according to claim 12, wherein the temperature is consistently between 10 and 50° C.

20. The method according to claim 12, wherein, in at least one of the separation steps B, D and F, the method for separation is selected from:
chromatographic methods;
solid phase extraction;
precipitation;
filtration and/or nanofiltration;
immobilisation of the siderophores on a carrier material; and
concentration of the metal-siderophore complexes by foaming and collecting the foam;
and combinations of the above-mentioned methods.

* * * * *